(12) United States Patent
Barve et al.

(10) Patent No.: US 10,443,855 B2
(45) Date of Patent: Oct. 15, 2019

(54) FLEXIBLE FUEL COMBUSTION SYSTEM FOR TURBINE ENGINES

(71) Applicant: Siemens Aktiengesellschaft, München (DE)

(72) Inventors: Vinayak V. Barve, Oviedo, FL (US);
Timothy A. Fox, Hamilton (CA);
Robert H. Bartley, Oviedo, FL (US);
Sachin Terdalkar, Oviedo, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 348 days.

(21) Appl. No.: 15/515,294

(22) PCT Filed: Oct. 23, 2014

(86) PCT No.: PCT/US2014/061889
§ 371 (c)(1),
(2) Date: Mar. 29, 2017

(87) PCT Pub. No.: WO2016/064391
PCT Pub. Date: Apr. 28, 2016

(65) Prior Publication Data
US 2017/0234542 A1 Aug. 17, 2017

(51) Int. Cl.
*F23R 3/36* (2006.01)
*F23R 3/28* (2006.01)
(Continued)

(52) U.S. Cl.
CPC ............ *F23R 3/36* (2013.01); *F02C 3/30* (2013.01); *F23D 17/00* (2013.01); *F23L 7/00* (2013.01); *F23R 3/28* (2013.01)

(58) Field of Classification Search
CPC .... F23R 3/36; F23R 3/28; F23R 3/286; F23R 3/20; F23R 3/10; F23R 3/32; F02C 3/30; F23D 17/00
See application file for complete search history.

(56) References Cited

U.S. PATENT DOCUMENTS 3,777,983 A * 12/1973 Hibbins ............... F23D 11/10
239/406
5,062,792 A * 11/1991 Maghon ............... F23C 7/004
431/284
(Continued)

FOREIGN PATENT DOCUMENTS

CN 103930725 A 7/2014
EP 2420729 A1 2/2012
(Continued)

OTHER PUBLICATIONS

PCT International Search Report and Written Opinion dated Jun. 22, 2015 corresponding to PCT Application No. PCT/US2014/061889 filed Oct. 23, 2014.

*Primary Examiner* — Todd E Manahan
*Assistant Examiner* — Eric W Linderman

(57) ABSTRACT

A fuel burner system (10) configured to inject a liquid fuel and a gas fuel into a combustor (12) of a turbine engine (14) such that the engine (14) may operate on the combustion of both fuel sources (20, 24) is disclosed. The fuel burner system (10) may be formed from a nozzle cap (16) including one or more first fuel injection ports (18) in fluid communication with a first fuel source (20) of syngas and one or more second fuel injection ports (22) in fluid communication with a second fuel source (24) of natural gas. The fuel burner system (10) may also include an oil lance (26) with one or more oil injection passages (28) that is in fluid communication with at least one oil source (30) and is configured to emit oil into the combustor (12). The oil lance (26) may (Continued)

include one or more fluid injection passages (32) configured to emit air to break up the oil spray and water to cool the combustor (12), or both.

14 Claims, 5 Drawing Sheets

(51) Int. Cl.
*F23D 17/00* (2006.01)
*F23R 3/14* (2006.01)
*F23L 7/00* (2006.01)
*F02C 3/30* (2006.01)

(56) References Cited

U.S. PATENT DOCUMENTS

| | | | |
|---|---|---|---|
| 5,361,578 A * | 11/1994 | Donlan | F02C 3/30 60/39.55 |
| 5,408,825 A * | 4/1995 | Foss | F23D 17/002 60/39.463 |
| 5,451,160 A * | 9/1995 | Becker | F23D 17/002 431/183 |
| 5,647,215 A * | 7/1997 | Sharifi | F23D 17/002 60/737 |
| 5,657,632 A * | 8/1997 | Foss | F23D 17/002 60/742 |
| 5,884,471 A * | 3/1999 | Anderson | F02C 7/222 60/39.23 |
| 6,270,338 B1 | 8/2001 | Eroglu et al. | |
| 6,915,636 B2 * | 7/2005 | Stuttaford | F23L 7/002 60/39.463 |
| 7,104,069 B2 * | 9/2006 | Martling | F23D 17/002 60/39.55 |
| 8,272,218 B2 | 9/2012 | Fox et al. | |
| 8,375,724 B2 | 2/2013 | Barve et al. | |
| 8,375,726 B2 | 2/2013 | Wiebe et al. | |
| 8,418,469 B2 * | 4/2013 | Myers | F23D 11/402 60/737 |
| 8,511,087 B2 | 8/2013 | Fox et al. | |
| 8,545,215 B2 * | 10/2013 | Bhagat | F23D 11/103 239/423 |
| 8,549,859 B2 | 10/2013 | Fox et al. | |
| 8,661,779 B2 | 3/2014 | Laster et al. | |
| 8,752,386 B2 | 6/2014 | Fox et al. | |
| 8,769,955 B2 | 7/2014 | Van Nieuwenhuizen et al. | |
| 9,371,998 B2 * | 6/2016 | Cramb | F23R 3/12 |
| 9,964,043 B2 * | 5/2018 | Myers | F02C 7/222 |
| 10,125,991 B2 * | 11/2018 | Ramier | F23R 3/283 |
| 2001/0018173 A1 * | 8/2001 | Tiemann | F23D 17/002 431/284 |
| 2003/0089111 A1 * | 5/2003 | Benelli | F23R 3/14 60/737 |
| 2006/0266046 A1 * | 11/2006 | Bonzani | F23D 17/00 60/746 |
| 2009/0061365 A1 * | 3/2009 | Prade | F23L 7/002 431/11 |
| 2009/0107147 A1 * | 4/2009 | Piper | F23R 3/14 60/738 |
| 2010/0018210 A1 | 1/2010 | Fox et al. | |
| 2010/0071374 A1 | 3/2010 | Fox et al. | |
| 2010/0071376 A1 | 3/2010 | Wiebe et al. | |
| 2010/0071377 A1 | 3/2010 | Fox et al. | |
| 2010/0077760 A1 | 4/2010 | Laster et al. | |
| 2010/0273117 A1 * | 10/2010 | Eroglu | F23C 7/002 431/9 |
| 2010/0307160 A1 | 12/2010 | Barve et al. | |
| 2011/0067402 A1 | 3/2011 | Wiebe et al. | |
| 2011/0091824 A1 | 4/2011 | Barve et al. | |
| 2011/0091829 A1 | 4/2011 | Barve et al. | |
| 2011/0203284 A1 | 8/2011 | Ritland et al. | |
| 2011/0203285 A1 | 8/2011 | Böttcher et al. | |
| 2011/0289928 A1 | 12/2011 | Fox et al. | |
| 2011/0296839 A1 | 12/2011 | Van Nieuwenhuizen et al. | |
| 2012/0047910 A1 | 3/2012 | Sutcu et al. | |
| 2012/0137691 A1 | 6/2012 | Böttcher et al. | |
| 2012/0208137 A1 * | 8/2012 | Kirzhner | F23R 3/36 431/12 |
| 2012/0227412 A1 | 9/2012 | Barve et al. | |
| 2012/0260666 A1 | 10/2012 | Barve et al. | |
| 2013/0031907 A1 * | 2/2013 | Woerz | F02C 3/30 60/740 |
| 2013/0055720 A1 | 3/2013 | Fox et al. | |
| 2013/0067920 A1 | 3/2013 | Fox et al. | |
| 2013/0074501 A1 | 3/2013 | Tiwary et al. | |
| 2013/0074946 A1 | 3/2013 | Ramier et al. | |
| 2013/0104554 A1 | 5/2013 | Bode et al. | |
| 2013/0174560 A1 | 7/2013 | Wiebe et al. | |
| 2014/0130502 A1 | 5/2014 | Böttcher et al. | |
| 2014/0208757 A1 | 7/2014 | Fox et al. | |
| 2014/0245740 A1 | 9/2014 | Wiebe et al. | |
| 2017/0138268 A1 * | 5/2017 | Nakahara | F02C 7/22 |
| 2017/0234542 A1 * | 8/2017 | Barve | F23L 7/00 60/746 |
| 2017/0284671 A1 * | 10/2017 | Asai | F23R 3/283 |
| 2018/0356097 A1 * | 12/2018 | Shershnyov | F23R 3/28 |
| 2018/0363907 A1 * | 12/2018 | Purcell | F23R 3/343 |

FOREIGN PATENT DOCUMENTS

| | | |
|---|---|---|
| EP | 2487420 A2 | 8/2012 |
| JP | 2004138376 A | 5/2004 |
| JP | 2004211558 A | 7/2004 |
| JP | 2004278875 A | 10/2004 |
| JP | 2006071275 A | 3/2006 |
| JP | 2010506131 A | 2/2010 |
| JP | 2011075174 A | 4/2011 |

* cited by examiner

FLEXIBLE FUEL COMBUSTION SYSTEM FOR TURBINE ENGINES

FIELD OF THE INVENTION

This invention is directed generally to turbine engines, and more particularly to fuel burner systems for turbine engines.

BACKGROUND

Typically, gas turbine engines include a plurality of injectors for injecting fuel into a combustor to mix with air upstream of a flame zone. The fuel injectors of conventional turbine engines may be arranged in one of at least three different schemes. Fuel injectors may be positioned in a lean premix flame system in which fuel is injected in the air stream far enough upstream of the location at which the fuel/air mixture is ignited that the air and fuel are completely mixed upon burning in the flame zone. Fuel injectors may also be configured in a diffusion flame system such that fuel and air are mixed and burned simultaneously. In yet another configuration, often referred to as a partially premixed system, fuel injectors may inject fuel upstream of the flame zone a sufficient distance that some of the air is mixed with the fuel. Partially premixed systems are combinations of a lean premix flame system and a diffusion flame system.

Typically, gas turbine engines configured to burn syngas include a combustor configured to burn syngas formed basically of H2 and CO and a diluent such as N2 or steam. The combustors are often a derivative of diffusion flame burners and burn a temperatures close to the stoichiometric flame temperatures, which increases the thermal load on the combustor basket, leading to damage of the combustor basket. Combustors configured to burn syngas are typically not configured to burn other fuel sources, thereby limiting potential fuels from possible use. Thus, a need exists for a fuel system capable of handling a more diverse selection of fuels.

SUMMARY OF THE INVENTION

A fuel burner system configured to inject a liquid fuel and a gas fuel into a combustor of a turbine engine such that the engine may operate on the combustion of both fuel sources is disclosed. The fuel burner system may be formed from a nozzle cap including one or more first fuel injection ports in fluid communication with a first fuel source of syngas and one or more second fuel injection ports in fluid communication with a second fuel source of natural gas. The fuel burner system may also include an oil lance with one or more oil injection passages that is in fluid communication with at least one oil source and is configured to emit oil into the combustor. The oil lance may include one or more fluid injection passages. In at least one embodiment, the fluid injection passages in the oil lance may be configured to emit air to break up the oil spray or water to cool the combustor, or both. The fuels may be co-fired, and in at least one embodiment, natural gas, oil and syngas may be co-fired together while water is injected into the combustor to reduce emissions, augment power and reduce combustor temperatures.

In at least one embodiment, the fuel burner system for a turbine engine may include one or more combustors formed from a combustor housing and one or more nozzle caps. The nozzle cap may include one or more first fuel injection ports in fluid communication with at least one first fuel source and one or more second fuel injection ports in fluid communication with at least one second fuel source. The first fuel source may contain a first fuel that is different than a second fuel contained within the second fuel source. In at least one embodiment, the first fuel source may contain syngas, and the second fuel source contains natural gas. In at least one embodiment, the first fuel injection port and the second fuel injection port may be configured to simultaneously inject the first fuel from the first fuel source and the second fuel from the second fuel source into one or more combustors. In at least one embodiment, the first fuel source may contain syngas, and the second fuel source may contain natural gas.

The fuel burner system may include one or more oil lances for injecting oil, water, air, or nitrogen, or any combination thereof, into one or more combustors. One or more oil lances may project from the nozzle cap. The oil lance may have one or more oil injection passages that is in fluid communication with one or more oil sources. The oil lance may be configured to emit oil into the combustor simultaneously with the syngas and natural gas. The oil lance may be configured to emit oil into the combustor while syngas or natural gas, or both, are being injected into the combustor. The fuel burner system may be configured to inject oil from the oil lance and syngas from the first fuel source simultaneously. In at least one embodiment, fuel burner system may be configured to inject oil from the oil lance and natural gas from the second fuel source simultaneously. The oil lance may have one or more fluid injection passages that is in fluid communication with one or more compressed air sources and may be configured to emit compressed air into the combustor. The fluid injection passage may be configured such that the fluid injection passage may emit compressed air into the combustor while oil is emitted from one or more oil injection passages into the combustor. In at least one embodiment, the oil lance may have one or more fluid injection passages that is in fluid communication with one or more water sources for emitting water into the combustor. The fluid injection passage may be configured such that the fluid injection passage may emit water into the combustor while oil is emitted from one or more oil injection passages into the combustor.

During operation, the oil injection passage of the oil lance may be used for ignition and low-load operation of the turbine engine. For ignition, oil may be injected through the oil injection passage into the combustor and compressed air may be injected through the fluid injection passage from the compressed air source. The compressed air may be used to break up the oil spray to increase the efficiency of combustion of the oil in the combustor. During higher load operation when oil is at least a partial fuel source, water may be injected through the fuel injection passage to limit NOx emissions and to cool the combustor.

An advantage of the fuel burner system is that the fuel burner system may be configured to operate with a high degree of fuel flexibility such that the fuel burner system may burn fuels, such as, but not limited to, low BTU fuels, high BTU fuels, liquid fuels or gas fuels, or any combination thereof.

Another advantage of the fuel burner system is that the fuel burner system may be configured to directly inject diluents, such as, but not limited to, steam or nitrogen into one or more combustors for emissions and power augmentation.

These and other embodiments are described in more detail below.

BRIEF DESCRIPTION OF THE DRAWINGS

The accompanying drawings, which are incorporated in and form a part of the specification, illustrate embodiments

DETAILED DESCRIPTION OF THE INVENTION

Figure 1:
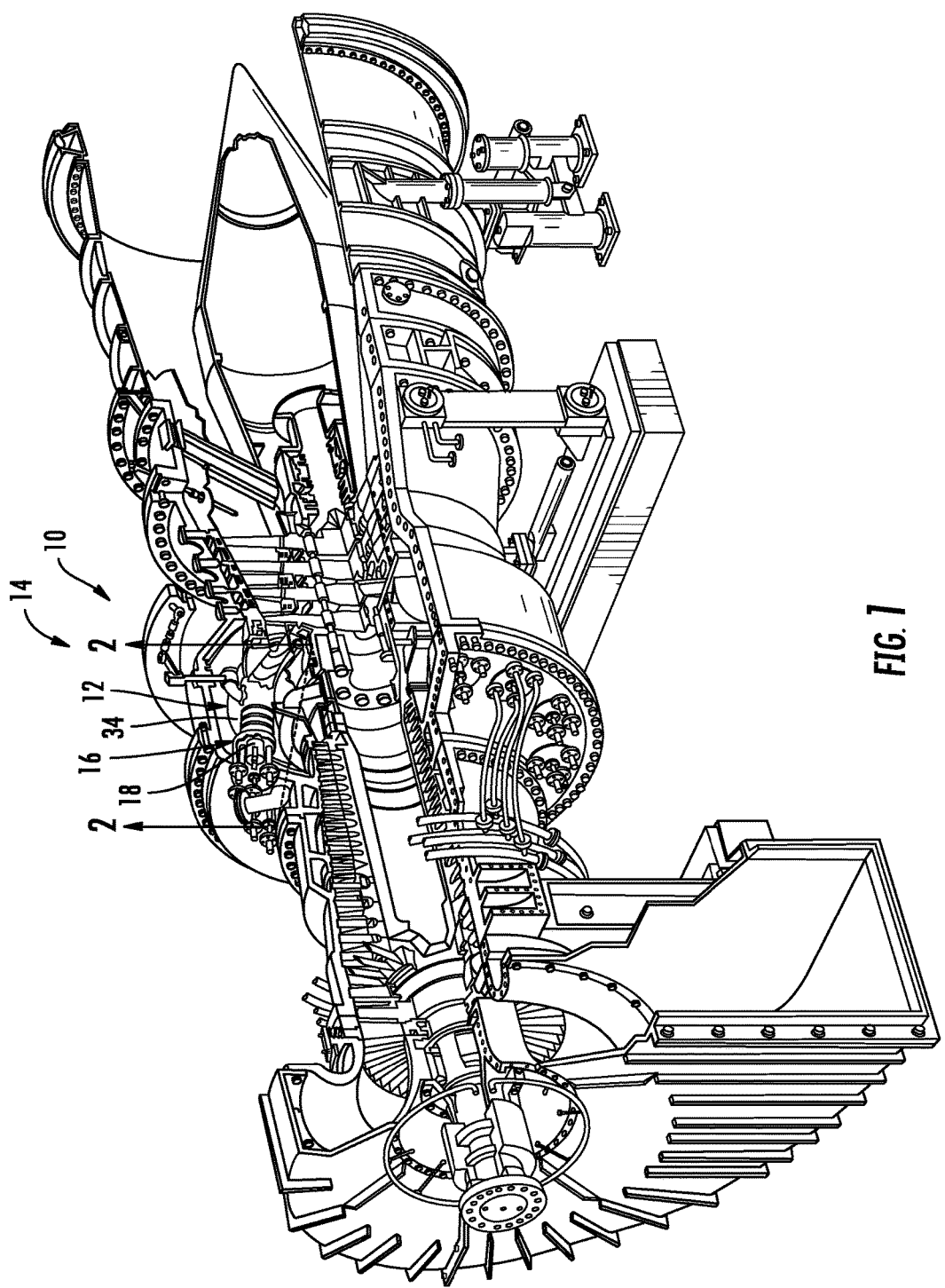
FIG. 1 is a cross-sectional view of a portion of a turbine engine including the fuel burner system.
Figure 2:
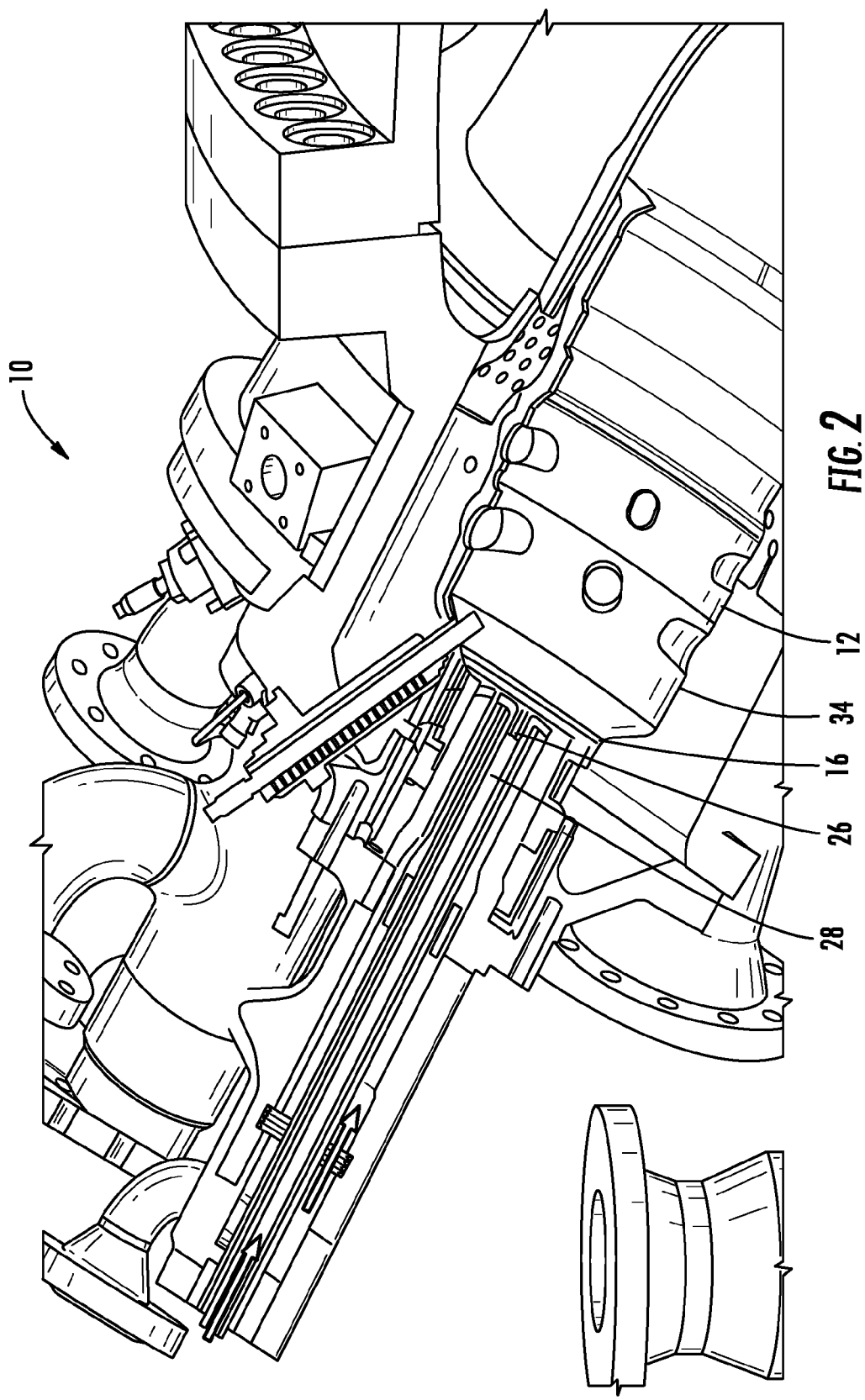
FIG. 2 is detailed, cross-sectional side view of a combustor with the fuel burner system taken at section line 2-2 in FIG. 1.

As shown in FIGS. 1-5, a fuel burner system 10 configured to inject a liquid fuel and a gas fuel into a combustor 12 of a turbine engine 14 such that the engine 14 may operate on the combustion of both fuel sources is disclosed. The fuel burner system 10 may be formed from a nozzle cap 16 including one or more first fuel injection ports 18 in fluid communication with a first fuel source 20 of syngas and one or more second fuel injection ports 22 in fluid communication with a second fuel source 24 of natural gas. The fuel burner system 10 may also include an oil lance 26 with one or more oil injection passages 28 that is in fluid communication with at least one oil source 30 and is configured to emit oil into the combustor 12. The oil lance 26 may include one or more fluid injection passages 32. In at least one embodiment, the fluid injection passages 32 in the oil lance 26 may be configured to emit air to break up the oil spray or water to cool the combustor, or both. The fuels may be co-fired, and in at least one embodiment, natural gas, oil and syngas may be co-fired together while water is injected into the combustor 12 to reduce emissions, augment power and reduce combustor temperatures.

Figure 3:
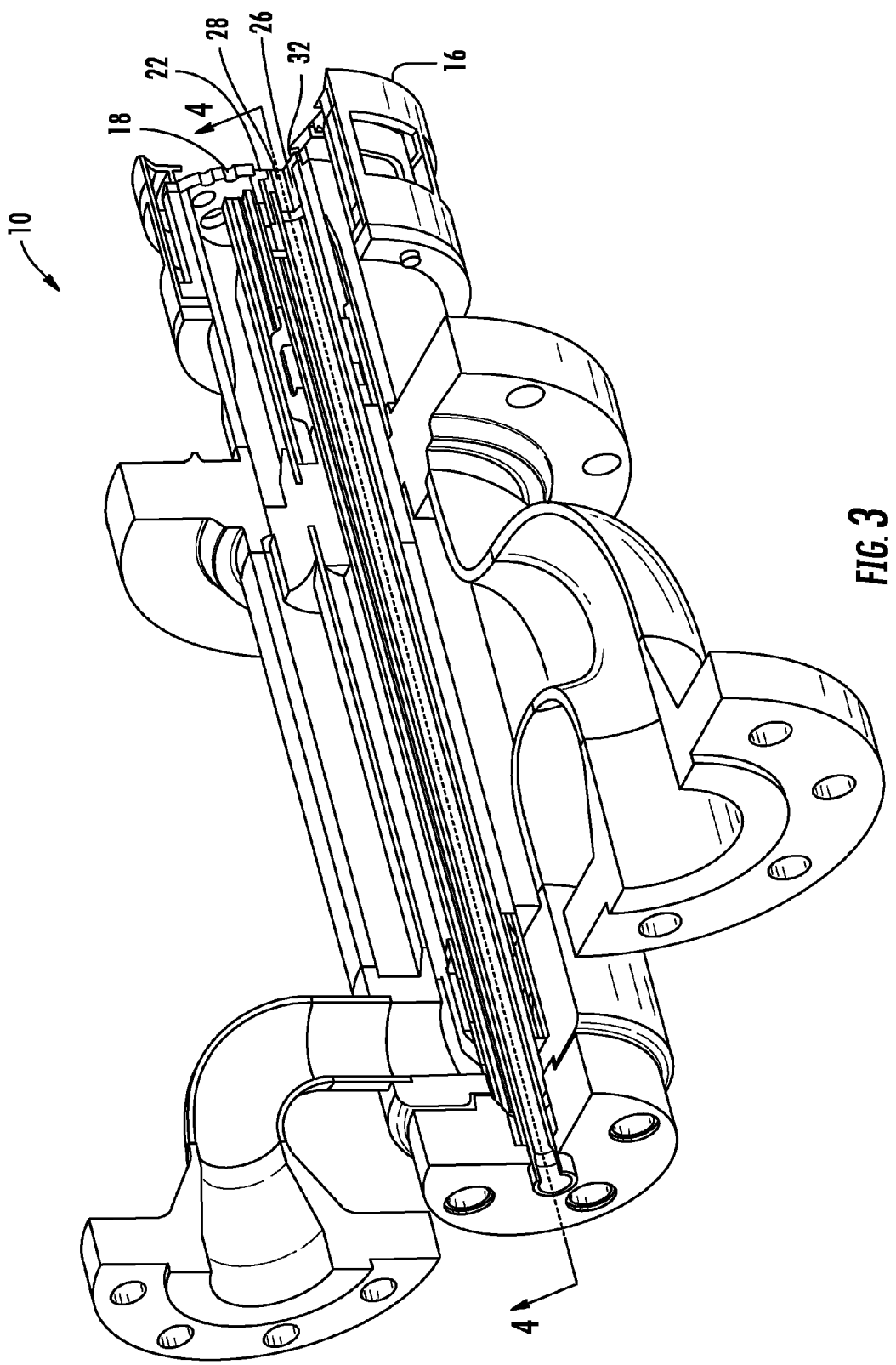
FIG. 3 is a partial cross-sectional, perspective view of the fuel burner system with the nozzle cap.
Figure 4:
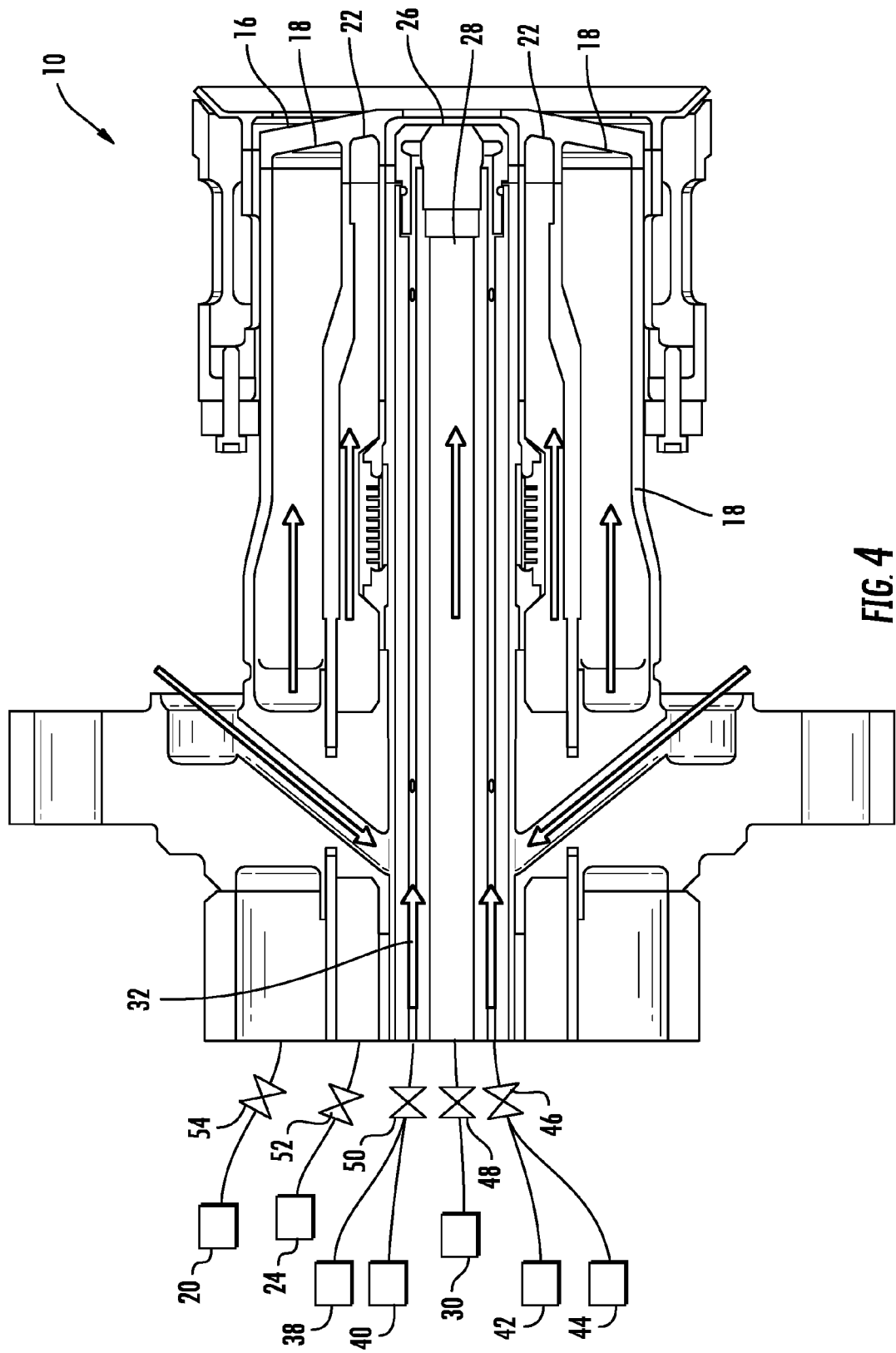
FIG. 4 is a cross-sectional view of the fuel burner system with the nozzle cap taken at section line 4-4 in FIG. 3.
Figure 5:
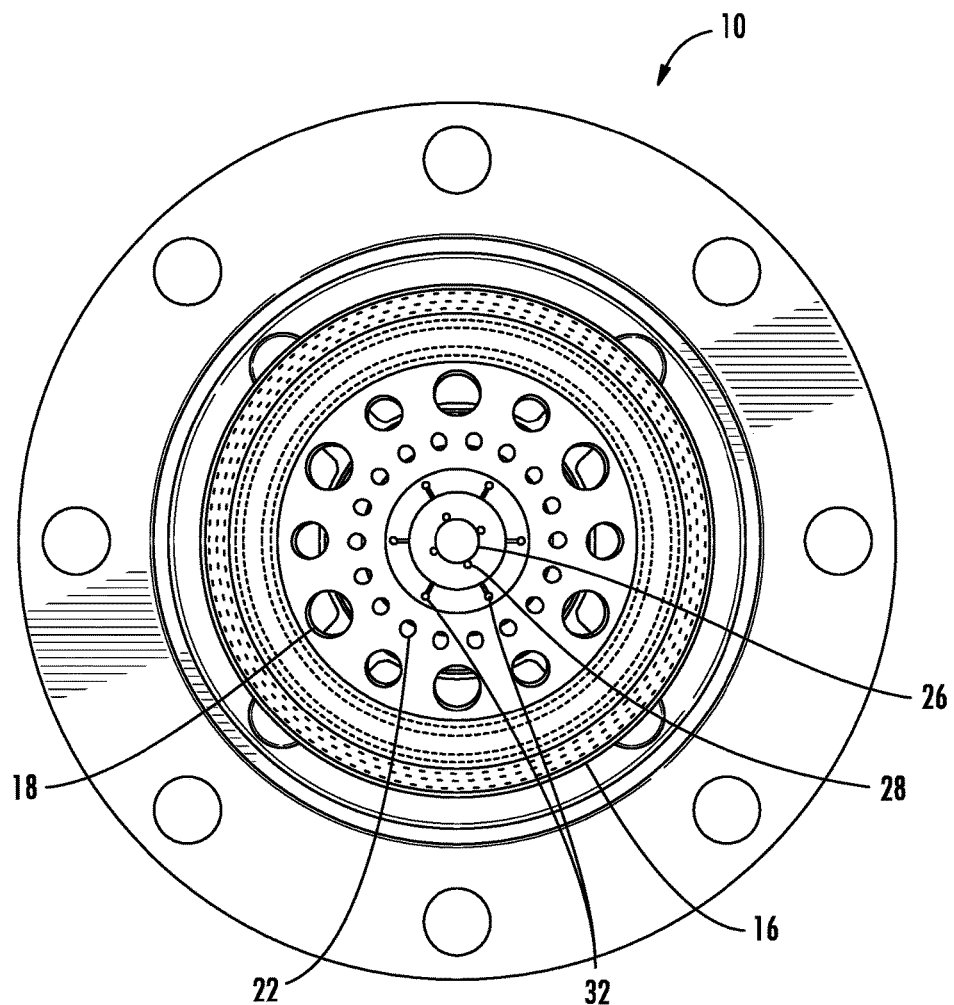
FIG. 5 is an end view of the fuel burner system with the nozzle cap.

In at least one embodiment, as shown in FIG. 1, the fuel burner system 10 may be formed from one or more combustors 12 formed from a combustor housing 34 and one nozzle caps 16. As shown in FIGS. 3-5, the nozzle cap 16 may include one or more first fuel injection ports 18 in fluid communication with one or more first fuel sources 20 and one or more second fuel injection ports 22 in fluid communication with one or more second fuel sources 24. The first fuel source 20 may contain a first fuel that is different than a second fuel contained within the second fuel source 24. In at least one embodiment, the first fuel in the first fuel source 20 may be syngas and the second fuel in the second fuel source 24 may be natural gas. The first fuel injection port 18 may be formed from a port 18 that is larger in size than the second fuel injection port 22. The first fuel injection port 18 with a larger size may be configured to emit highly diluted syngas or low BTU fuels. The smaller second fuel injection port 22 may be configured to emit natural gas or high BTU fuels. In at least one embodiment, the first fuel injection port 22 and the second fuel injection port 22 may be configured to simultaneously inject the first fuel from the first fuel source 20 and the second fuel from the second fuel source 24 into the combustor 12. The flow of the first fuel from the first fuel source 20 to the first fuel injection port 18 may be controlled via one or more valves 54, and the flow of the second fuel from the second fuel source 24 to the second fuel injection port 22 may be controlled via one or more valves 52. Combusting the two or more fuels in the combustor 12 at the same time is co-firing. In least one embodiment, the first fuel source 20 may contain syngas, and the second fuel source 24 contains natural gas which may be co-fired within the combustor 12.

As shown in FIG. 4, the fuel burner system 10 may also include one or more oil lances 26 projecting from nozzle cap 16. The oil lance 26 may have one or more oil injection passages 28 that is in fluid communication with one or more oil sources 30. The oil injection passage 28 may be configured to emit oil into the combustor 12 simultaneously with the syngas and natural gas. The flow of oil from the oil source 30 may be controlled via one or more valves 48 to the oil injection passage 28. The fuel burner system 10 may be configured to inject oil from the oil lance 26 and syngas from the first fuel source 20 simultaneously. In at least one embodiment, the fuel burner system 10 may be configured to inject oil from the oil lance 26 and natural gas from the second fuel source 24 simultaneously.

The oil lance 26 may have one or more fluid injection passages 32 that is in fluid communication with one or more compressed air sources 38 and is configured to emit compressed air into the combustor 12. The flow of compressed air from the compressed air sources 38 may be controlled via one or more valves 50 to the fluid injection passage 32. The oil lance 26 may also have one or more fluid injection passages 32 that is in fluid communication with one or more water sources 40 for emitting water into the combustor 12. The fluid injection passages 32 may be configured to emit water into the combustor 12. The flow of water from the water source 40 may be controlled via one or more valves 50 to the fluid injection passage 32. While being configured to emit water into the combustor 12, the oil lance 26 may include one or more oil injection passages 28 that is in fluid communication with one or more oil sources 30 and is configured to emit oil into the combustor 12.

During operation, the oil injection passage 28 of the oil lance 26 may be used for ignition and low-load operation of the turbine engine 14. For ignition, oil may be injected through the oil injection passage 28 into the combustor 12 and compressed air may be injected through the fluid injection passage 32 from the compressed air source 40. The compressed air may be used to break up the oil spray to increase the efficiency of combustion of the oil in the combustor 12. During higher load operation when oil is at least a partial fuel source, water may be injected through the fluid injection passage 32 to limit NOx emissions and to cool the combustor 12.

The fuel burner system 10 may be operated such that oil and syngas may be co-fired, such as, but not limited to, via simultaneous injection into the combustor 12. In another embodiment, the fuel burner system 10 may be operated such that natural gas and syngas may be co-fired, such as, but not limited to, via simultaneous injection into the combustor 12. In yet another embodiment, the fuel burner system 10 may be operated such that natural gas and oil may be co-fired, such as, but not limited to, via simultaneous injection into the combustor 12. In still another embodiment, the fuel burner system 10 may be operated such that three fuels, such as, but not limited to, syngas, natural gas and oil, may be co-fired at the same time. The fluid injection passage 32 of the oil lance 26 may be used to inject water into the combustor 12 during co-firing or two fuels or during co-firing of the syngas, natural gas and oil together to reduce emissions, augment power and reduce combustor temperatures.

In at least one embodiment, the fuel burner system 10 may be operated to inject steam into the combustor 12 during natural gas or oil operation to reduce emissions or reduce metal temperatures, or both. The steam may be injected via the fluid injection passage 32 of the oil lance 26 from a steam source 42. The steam may also be injected via other means as well. The flow of steam from one or more steam sources 42 may be controlled via one or more valves 46 to the fluid injection passage 32.

In at least one embodiment, the fuel burner system 10 may be operated to inject nitrogen into the combustor 12 during natural gas or oil operation to reduce emissions or reduce metal temperatures, or both. The nitrogen may be injected via the fluid injection passage 32 of the oil lance 26 from a nitrogen source 44. The nitrogen may also be injected via other means as well. The flow of nitrogen from one or more nitrogen sources 44 may be controlled via one or more valves 46 to the fluid injection passage 32.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A fuel burner system for a turbine engine, comprising:
at least one combustor formed from a combustor housing and at least one nozzle cap; and
wherein the at least one nozzle cap includes at least one first fuel injection port in fluid communication with at least one first fuel source and at least one second fuel injection port in fluid communication with at least one second fuel source;
wherein the at least one first fuel source contains a first fuel that is different than a second fuel contained within the at least one second fuel source; and
at least one oil lance projecting from the at least one nozzle cap, wherein the at least one oil lance has at least one oil injection passage that is in fluid communication with at least one oil source and is configured to emit oil into the at least one combustor,
wherein the at least one oil lance has at least one fluid injection passage that is in fluid communication with at least one compressed air source and is configured to emit compressed air into the at least one combustor,
wherein the at least one oil lance has at least one fluid injection passage that is in fluid communication with at least one water source for emitting water into the at least one combustor.

2. The fuel burner system of claim 1, wherein the at least one first fuel source contains syngas, and the at least one second fuel source contains natural gas.

3. The fuel burner system of claim 1, wherein the at least one first fuel injection port and the at least one second fuel injection port are configured to simultaneously inject the first fuel from the at least one first fuel source and the second fuel from the at least one second fuel source into the at least one combustor.

4. The fuel burner system of claim 3, wherein the at least one first fuel source contains syngas, and the at least one second fuel source contains natural gas.

5. The fuel burner system of claim 4, wherein the at least one oil injection passage is configured to emit oil into the at least one combustor simultaneously with the syngas and natural gas.

6. The fuel burner system of claim 1, wherein the fuel burner system is configured to inject oil from the at least one oil lance and syngas from the at least one first fuel source simultaneously.

7. The fuel burner system of claim 1, wherein the fuel burner system is configured to inject oil from the at least one oil lance and natural gas from the at least one second fuel source simultaneously.

8. The fuel burner system of claim 1, wherein the at least one oil lance has at least one fluid injection passage that is in fluid communication with at least one steam source and is configured to emit steam into the at least one combustor.

9. The fuel burner system of claim 1, wherein the at least one oil lance has at least one fluid injection passage that is in fluid communication with at least one nitrogen source and is configured to emit nitrogen into the at least one combustor.

10. A fuel burner system for a turbine engine, comprising:
at least one combustor formed from a combustor housing and at least one nozzle cap; and
wherein the at least one nozzle cap includes at least one first fuel injection port in fluid communication with at least one first fuel source and at least one second fuel injection port in fluid communication with at least one second fuel source;
wherein the at least one first fuel source contains a first fuel that is different than a second fuel contained within the at least one second fuel source;
wherein the at least one first fuel injection port and the at least one second fuel injection port are configured to simultaneously inject the first fuel from the at least one first fuel source and the second fuel from the at least one second fuel source into the at least one combustor;
wherein the at least one first fuel source contains syngas, and the at least one second fuel source contains natural gas; and
at least one oil lance projecting from the at least one nozzle cap, wherein the at least one oil lance has at least one oil injection passage that is in fluid communication with at least one oil source and is configured to emit oil into the at least one combustor,
wherein the at least one oil lance has at least one fluid injection passage that is in fluid communication with at least one water source for emitting water into the at least one combustor.

11. The fuel burner system of claim 10, wherein the at least one oil injection passage is configured to emit oil into the at least one combustor simultaneously with syngas and natural gas be emitted by the at least one first and second fuel injection ports.

12. The fuel burner system of claim 10, wherein the fuel burner system is configured to inject oil from the at least one oil lance and syngas from the at least one first fuel source simultaneously.

13. The fuel burner system of claim 10, wherein the fuel burner system is configured to inject oil from the at least one oil lance and natural gas from the at least one second fuel source simultaneously.

14. The fuel burner system of claim 10, wherein the at least one oil lance has at least one fluid injection passage that is in fluid communication with at least one compressed air source and is configured to emit compressed air into the at least one combustor.

* * * * *